United States Patent [19]

DeBalko

[11] Patent Number: 5,703,944

[45] Date of Patent: Dec. 30, 1997

[54] NETWORK INTERFACE DEVICE

[75] Inventor: George Andrew DeBalko, Washington Township, Morris County, N.J.

[73] Assignee: Lucent Technologies Inc., Murray Hill, N.J.

[21] Appl. No.: 534,145

[22] Filed: Sep. 27, 1995

[51] Int. Cl.[6] .......................... H04M 11/00; H04M 1/00; H04M 3/42; H01C 7/12
[52] U.S. Cl. .......................... 379/399; 379/60; 379/201; 379/412; 379/428; 379/451; 361/119; 361/643
[58] Field of Search ..................... 379/60, 399, 201, 379/428, 451, 412; 361/119, 643

[56] References Cited

U.S. PATENT DOCUMENTS

| | | | |
|---|---|---|---|
| 5,363,440 | 11/1994 | Daoud | 379/399 |
| 5,369,548 | 11/1994 | Combs | 361/643 |
| 5,497,416 | 3/1996 | Butler, III et al. | 379/399 |
| 5,508,873 | 4/1996 | Knapp et al. | 361/119 |
| 5,515,435 | 5/1996 | DeBalko et al. | 379/399 |
| 5,521,963 | 5/1996 | Schrader et al. | 379/60 |
| 5,528,684 | 6/1996 | Schneider et al. | 379/399 |

*Primary Examiner*—Jack Chiang
*Assistant Examiner*—Allan Hoosain

[57] ABSTRACT

Disclosed is a device for providing an interface between a customer and a combined telecommunications and cable TV network. The device includes a bottom portion including cable TV interdiction equipment which is connected through the top portion by a coaxial jumper cable. The top and bottom portions are mounted so as to prevent access to the interdiction equipment by the customer.

12 Claims, 2 Drawing Sheets

NETWORK INTERFACE DEVICE

BACKGROUND OF THE INVENTION

This invention relates to telecommunications network interface devices.

For subscribers of today, telecommunications and cable TV services are provided by separate suppliers. Thus, the subscriber normally has two interface devices on the side of his or her house. In the coming information superhighway, voice, data, and broadband signals will be supplied to each subscriber from an integrated network. In one proposed system, the signals will be provided to each customer by means of a coaxial cable and tip and ring wires connected to a network interface device on the side of the customer's house. The interface device includes two adjacent compartments, one accessible by the customer and the other accessible only by the supplier's personnel. The customer's compartment includes Plain Old Telephone (POTS) terminals and one end of a coaxial jumper cable. The supplier's compartment includes the other end of the jumper cable as well as protectors and a ground bar. (See, e.g., U.S. patent application of DeBalko et al., Ser. No. 08/344,300, filed Nov. 23, 1994 and assigned to the present assignee.)

Such designs are directed primarily to housing telecommunications equipment. However, it is also a concern as to what to do with cable TV interdiction equipment designed to add noise to the incoming channels for which the subscriber has not paid. For example, combining the interdiction and telecommunications equipment may result in an interface unit which is too big and expensive to suit customer needs. Also, two different vendors may supply the telecommunications and cable TV services and need access to their own equipment without interfering with the other vendor's product. Therefore, it is desirable to provide an enclosure for both telecommunications and cable services which does not take up too much room on the side of a customer's house. It is also desirable to be able to retrofit with existing telecommunications enclosures.

SUMMARY OF THE INVENTION

The invention is a device for providing an interface between a customer and a combination telecommunications and cable TV network. The device comprises a bottom portion including cable TV interdiction equipment and means for receiving a coaxial cable carrying cable TV signals thereon. A top portion including telecommunications equipment is removably mounted to the bottom portion. A coaxial jumper cable is connected between the equipment in the top and bottom portions.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
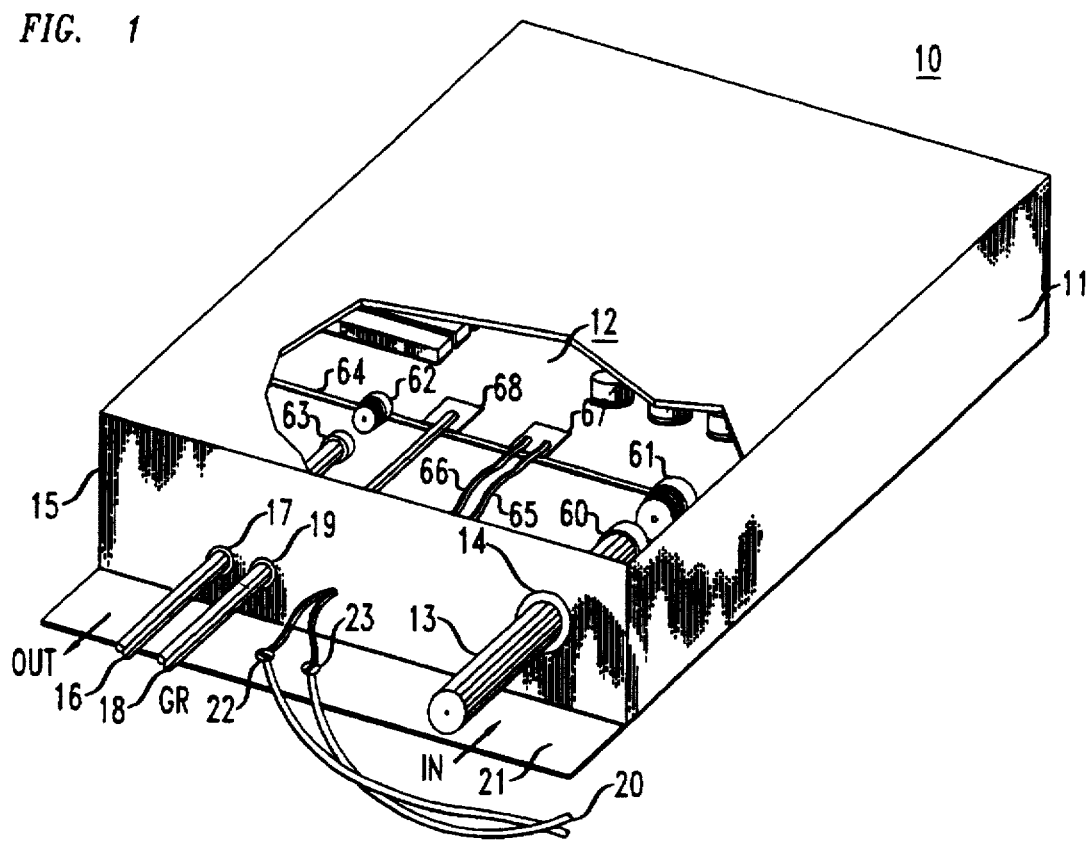
FIG. 1 is a partially cut-away perspective view of a portion of a device in accordance with an embodiment of the invention.

FIG. 1 illustrates a bottom, or base, portion of the device in accordance with one embodiment. The base portion, 10, includes a rectangular housing, 11, which is made of a metal such as cast aluminum to provide RF shielding for the components within the housing. Standard interdiction circuitry, 12, is enclosed by the housing, 11, and includes components on a printed circuit board, 64. The coaxial cable, 13, which transmits cable TV signals from the combined cable and telephone network, is fed into the housing, 11, through aperture, 14, in one side wall, 15, of the housing and connected to the interdiction circuit by means of coaxial connectors, 60 and 61, the latter being mounted to the circuit board. The interdiction circuitry can be of the standard type and, therefore, is not discussed in detail.

Coupled to the output of the interdiction circuitry, 12, by means of coaxial connectors, 62 and 63 (connector 62 also being mounted to the circuit board), is a coaxial jumper cable, 16, which is fed through an aperture, 17, in the wall, 15, of the housing, 11. Coupled to a ground portion, 68, of the interdiction circuitry, 12, is a ground wire, 18, which is also fed through an aperture, 19, in the wall, 15. Power in this embodiment is supplied to the circuitry by means of a wire pair, 20, which is coupled to a surface portion, 21, of the housing, 11, by means of a pair of screws, 22 and 23. While the surface portion, 21, is shown external to the housing, 11, it may also be located within the housing. The wire pair, 20, is coupled to an appropriate power source (not shown) and to the interdiction circuit, 12, by means of a wire pair, 65 and 66, which extends from the screws, 22 and 23, under the wall, 15, to an appropriate pad, 67, on the circuit board. If desired, the power could also be provided from the network through the coaxial cable, 13.

Figure 2:
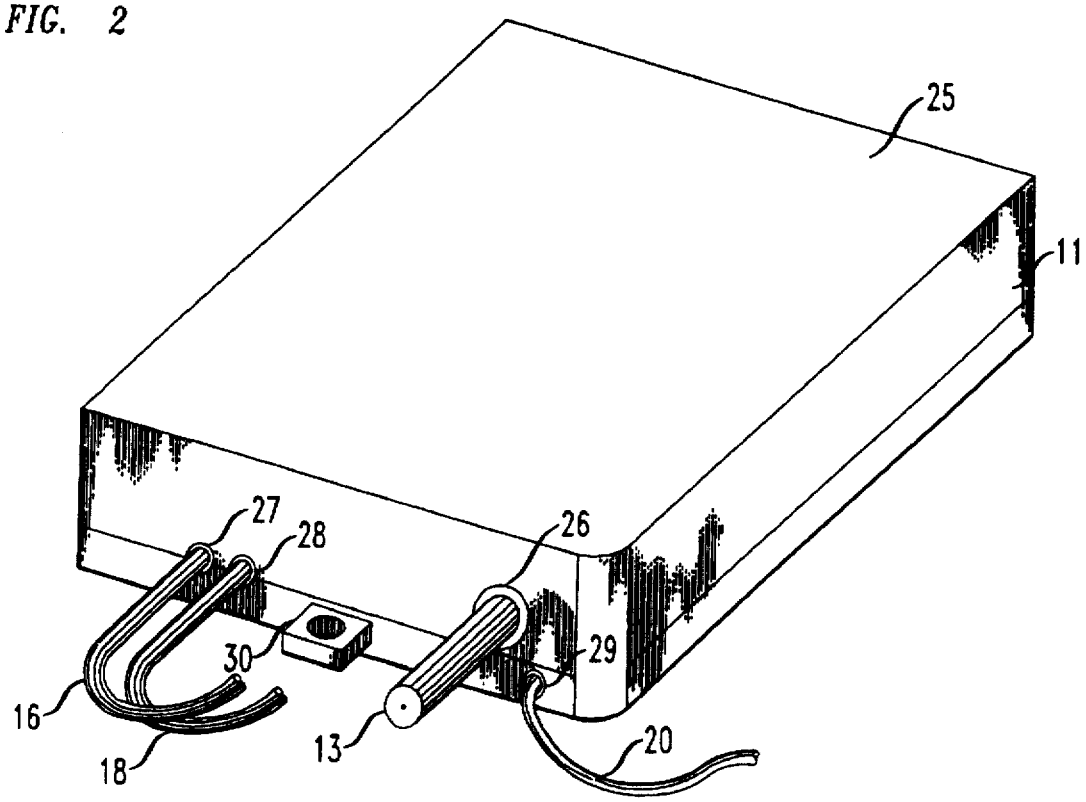
FIG. 2 is a perspective view of a further portion of a device in accordance with the same embodiment.

As illustrated in FIG. 2, placed over the metal housing, 11, is a second housing, 25, which is made of a material such as plastic. Preferably, the second housing covers the top portion of the metal housing, 11, and extends to and covers the surface portion, 21, to enclose the screws, 22 and 23. The second housing, 25, includes the appropriate apertures, 26-29, to permit feedthrough of the input cable, 13, the jumper cable, 16, the ground wire, 18, and the power wire pair, 20, respectively. A tab, 30, is also provided on one wall of the second housing to permit attachment of a further housing to be described.

Advantageously, the second housing, 25, is made of a material which is corrosion resistant to protect the metal housing, 11. In an alternative embodiment, a single housing of a corrosion resistant material may be employed in place of the two housings, 11 and 25, of this embodiment.

Figure 3:
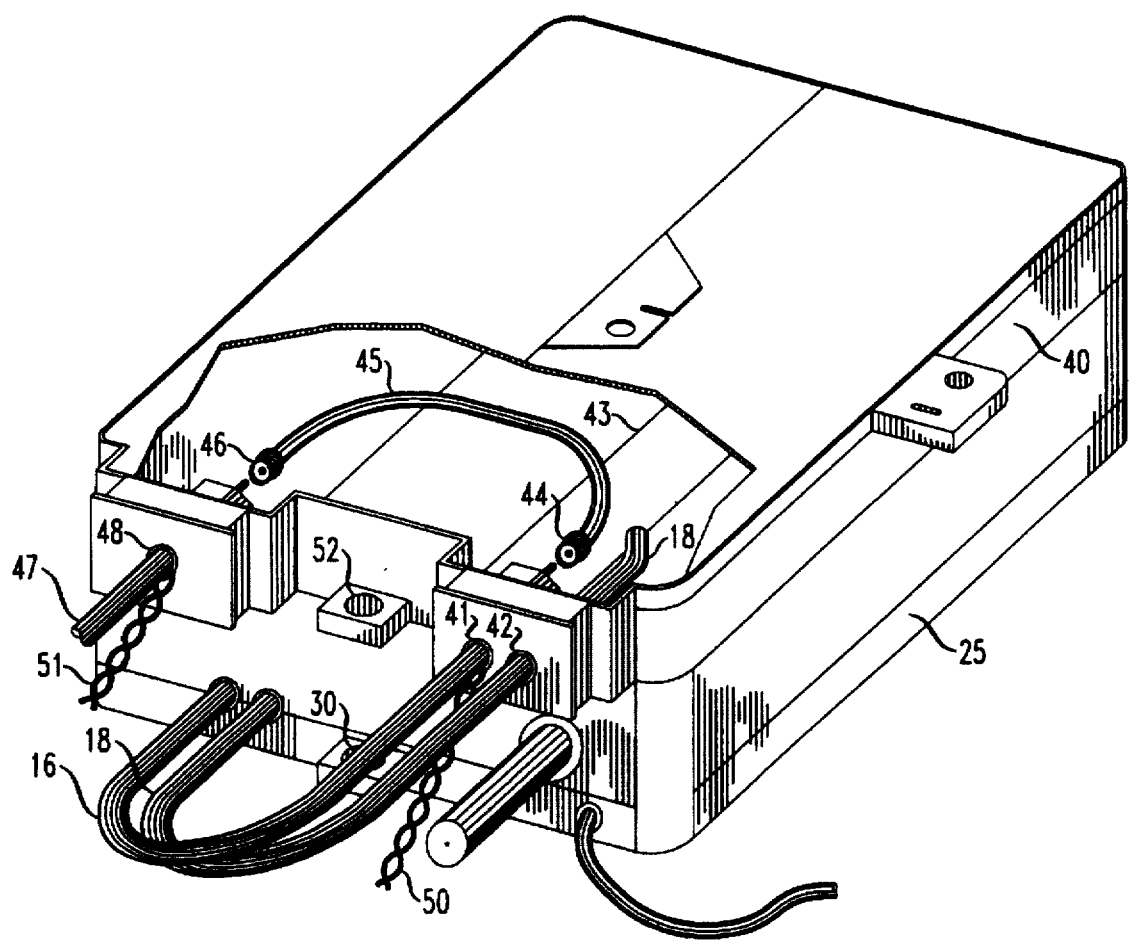
FIG. 3 is a perspective view of an essentially complete device in accordance with the same embodiment.

As illustrated in FIG. 3, a third housing, 40, is mounted over the second housing, 25. This housing includes basic telecommunications equipment such as that shown, for example, in U.S. patent application of DeBalko et al., Ser. No. 08/344,300 filed on Nov. 23, 1994, which is incorporated by reference herein. Briefly, such a housing would typically include a plurality of Plain Old Telephone (POTS) terminals (not shown) coupled to corresponding protectors (not shown) which are also coupled to a metal bar, 43, serving as a ground connection.

The ground wire, 18, from housings 11 and 25 is fed through an aperture, 42, in the third housing, 40, and electrically coupled to the ground bar, 43. The coaxial jumper cable, 16, from the housings is also fed through an aperture, 41, in the third housing, 40, but is coupled to a coaxial connector, 44, which is mounted to the ground bar, 43. The connector, 44, is located at one end of an additional coaxial jumper cable, 45, which extends into a portion of the housing, 40, accessible to the customer and terminates in another connector, 46. The connector, 46, which can be free to move within the housing, is coupled to an additional coaxial cable, 47, which is fed through an aperture, 48, in the housing, 40, and extends to the customer's premises. A twisted wire pair, 50, which carries telephone signals from the combined telecommunications and cable TV network is fed through the same aperture, 41, as the jumper cable, 16, and is coupled to the POTS terminals. A twisted wire pair, 51, coupled to the customer's end of the terminals is fed through the same aperture, 48, as the coaxial cable, 47.

The third housing, 40, is, desirably, mounted on top of the second housing, in a manner which prevents access to the interdiction circuitry by the customer. This can be done, for example, by attaching a screw, such as a coin phone security screw (not shown), through the aligned tabs, 30 and 52, on the housings, 25 and 40, respectively. This screw could only be removed by a craftsperson having a special tool. If desired, hinged members (not shown) can also be provided between the housings. Further, tampering could be exposed by utilizing a permanent sealing ring which would be broken by removing the third housing, 40.

Thus, advantageously, the broadband (e.g., cable TV) signals can be sent through a bottom or base housing, 11 and 25, containing the interdiction equipment, then on to an upper housing, 40, where the signals are then sent to the customer's premises equipment. The telephone and interdicted TV signals are coupled to equipment in the upper housing and then on to the customer's premises equipment. While the customer has access to the telephone terminals for testing his or her phone equipment, he or she does not have access to the interdiction equipment which controls what programs can be viewed. Further, the interface device described takes up no more surface area than a standard telephone interface unit.

Various modifications of the invention will become apparent to those skilled in the art. For example, although separate apertures, 14, 17 and 19, are shown, a single aperture could be used to admit all cables and wires to the inner housing, 11. Similarly, a single aperture could be used in housings 25 and 40.

The invention claimed is:

1. A device for providing an interface between a customer and combination telecommunications and cable TV network comprising:

a bottom portion forming a first enclosed housing for cable TV interdiction equipment and means for receiving a coaxial cable carrying cable TV signals thereon;

a separate top portion forming a second enclosed housing for telecommunication equipment, the second enclosed housing being removably mounted on top of the first enclosed housing, the second enclosed housing and telecommunication equipment being removable without requiring access to the first housing; and a coaxial jumper cable connected between the equipment in the top and bottom portions.

2. The device according to claim 1 wherein the bottom portion includes an inner housing made of a metal and an outer housing made of a corrosion resistant material.

3. The device according to claim 1 wherein the means for receiving the coaxial cable comprises an aperture in the first enclosed housing enclosing the interdiction equipment.

4. The device according to claim 1 wherein the bottom portion further includes means for connecting a wire pair carrying power to the interdiction equipment.

5. The device according to claim 1 further comprising a ground wire connected between the top and bottom portions.

6. The device according to claim 1 wherein the top and bottom portions are mounted by means of aligned tabs on the first and second housings of the top and bottom portions.

7. The device according to claim 6 wherein the tabs are attached to each other by a fastener which requires a special tool to remove.

8. The device according to claim 1 wherein the top portion includes a ground bar, a second coaxial jumper cable coupled to the first coaxial jumper cable, and a third coaxial cable coupled to the second jumper cable and extending through the top portion to a customer's premises equipment.

9. The device according to claim 1 wherein the top portion includes means for receiving a twisted wire pair carrying telecommunications signals to and from the network, and means for receiving another twisted wire pair carrying telecommunications to and from a customer.

10. The device according to claim 1, wherein the first enclosed housing and the second enclosed housing are stacked and have substantially the same length and width dimensions.

11. The device according to claim 10, wherein the second enclosed housing takes up no more surface area than the first enclosed housing.

12. The device according to claim 1, wherein the first enclosed housing includes a locking member that requires a special tool for access to the first enclosed housing and the second enclosed housing is accessible without the special tool.

* * * * *